United States Patent
Tashima et al.

(10) Patent No.: US 7,941,264 B2
(45) Date of Patent: May 10, 2011

(54) FUEL SUPPLY DEVICE FOR FLEXIBLE-FUEL INTERNAL COMBUSTION ENGINE

(75) Inventors: Kazuchika Tashima, Toyota (JP); Masahiko Teraoka, Toyota (JP); Tomohiro Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 91 days.

(21) Appl. No.: 12/540,813

(22) Filed: Aug. 13, 2009

(65) Prior Publication Data

US 2010/0049425 A1 Feb. 25, 2010

(30) Foreign Application Priority Data

Aug. 21, 2008 (JP) ................................. 2008-212931

(51) Int. Cl.
*F02D 41/30* (2006.01)
(52) U.S. Cl. ..................... 701/109; 123/299; 123/674
(58) Field of Classification Search .......... 701/101–105, 701/107, 109–111, 114, 115; 123/1 A, 299, 123/300, 431, 478, 480, 494, 514, 515, 575, 123/674, 675, 698, 699, 703
See application file for complete search history.

(56) References Cited

U.S. PATENT DOCUMENTS

| 7,650,874 B2 * | 1/2010 | Takubo | 123/434 |
| 2008/0115486 A1 * | 5/2008 | Yurgil | 60/277 |
| 2009/0082947 A1 * | 3/2009 | Tashima | 701/109 |
| 2010/0049424 A1 * | 2/2010 | Tashima et al. | 701/103 |
| 2010/0145596 A1 * | 6/2010 | Nishimura | 701/103 |

FOREIGN PATENT DOCUMENTS

| JP | 4-116234 | 4/1992 |
| JP | 5-66261 | 9/1993 |
| JP | 2009-79496 | 4/2009 |

* cited by examiner

*Primary Examiner* — John T Kwon
(74) *Attorney, Agent, or Firm* — Oblon, Spivak, McClelland, Maier & Neustadt, L.L.P.

(57) ABSTRACT

When it is detected in a fuel supply device for a flexible-fuel internal combustion engine that a refueling operation has been performed for a fuel tank, a return suppression process in which fuel in a delivery pipe is prohibited from returning to the fuel tank through a high-pressure return passage is executed until a concentration learning process is started. After the concentration learning process is started, a compulsory return process in which fuel in the delivery pipe is compulsorily returned to the fuel tank through the high-pressure return passage is executed.

7 Claims, 6 Drawing Sheets

FUEL SUPPLY DEVICE FOR FLEXIBLE-FUEL INTERNAL COMBUSTION ENGINE

INCORPORATION BY REFERENCE

The disclosure of Japanese Patent Application No. 2008-212931 filed on Aug. 21, 2008 including the specification, drawings and abstract is incorporated herein by reference in its entirety.

BACKGROUND OF THE INVENTION

1. Field of the Invention

The present invention relates to a fuel supply device for a flexible-fuel internal combustion engine that operates on alcohol-blend fuel.

2. Description of the Related Art

Flexible-fuel internal combustion engines that operate on alcohol-blend fuel, prepared by mixing alcohol with gasoline at an appropriate ratio, have been described in the art (see Japanese Patent Application Publication No. 4-116234 (JP-A-4-116234), for example). Because alcohol contains a different number of carbon atoms from the number of carbon atoms contained in normal fuel such as gasoline, it is necessary to control the fuel injection amount in accordance with the type and concentration of the alcohol in the blended fuel in such flexible-fuel internal combustion engines. For example, ethanol has a low theoretical air-fuel ratio compared to gasoline. In the case where a blended fuel containing ethanol is used, it is necessary to increase the fuel injection amount so that the concentration of oxygen present in the exhaust is equal to that in exhaust discharged when gasoline is combusted at its theoretical air-fuel ratio. If the fuel injection amount is corrected based on the alcohol concentration in this way, a catalyst device provided in an exhaust passage is able to appropriate purify the exhaust gas. In flexible-fuel internal combustion engines, therefore, the concentration of alcohol contained in fuel is learned based on the oxygen concentration detected by an oxygen concentration sensor provided in the exhaust passage, and the fuel injection amount is corrected on the basis of the learned concentration of alcohol.

The concentration of alcohol in fuel used by a flexible-fuel internal combustion engine may vary. That is, a fuel with a different alcohol concentration from a fuel currently stored in a fuel tank may be supplied. Thus, the alcohol concentration of fuel may vary significantly when a refueling operation is performed until the alcohol concentration in a fuel supply system becomes uniform in subsequent engine operation. If the alcohol concentration of fuel stored in the fuel tank varies, still, the fuel injection amount may be corrected in accordance with the instantaneous alcohol concentration of the fuel once the alcohol concentration has been learned. In order to ensure accuracy, however, the alcohol concentration learning process cannot be started until predetermined execution conditions are satisfied. Even if the execution conditions are satisfied, and the alcohol concentration learning process is started, the alcohol concentration learning cannot be completed until the alcohol concentration in the fuel supply system becomes uniform in order to maintain the accuracy of the learned alcohol concentration. Thus, the alcohol concentration learning process must be carried out over a predetermined period time between the start and the completion of process. If the alcohol concentration of fuel is varied by a refueling operation, therefore, the fuel injection amount cannot be corrected in accordance with the alcohol concentration of the fuel until a predetermined period elapses, deteriorating the air-fuel ratio.

SUMMARY OF THE INVENTION

The present invention provides a fuel supply device for a flexible-fuel internal combustion engine that suppresses deterioration of the air-fuel ratio after a fuel with a different alcohol concentration is supplied.

A first aspect of the present invention provides a fuel supply device for a flexible-fuel internal combustion engine, including: a main passage through which a fuel pump pumps fuel from a fuel tank to a delivery pipe; a return passage through which fuel is returned from the delivery pipe to the fuel tank; a learning section that executes a concentration learning process in which a concentration of alcohol contained in fuel in the fuel tank is learned as a concentration learned value through an air-fuel ratio feedback control based on an oxygen concentration detected by an oxygen concentration sensor provided in an exhaust passage; a refueling operation detection section that detects whether a refueling operation has been performed for the fuel tank; and a return process control section that, when the refueling operation detection section detects that a refueling operation has been performed, executes a return suppression process to prevent fuel in the delivery pipe from returning to the fuel tank through the return passage for a predetermined period before the learning section starts the air-fuel ratio feedback control, and the return process control section executes a compulsory return process in which fuel in the delivery pipe is compulsorily returned to the fuel tank through the return passage after the air-fuel ratio feedback control is started.

In the first aspect, the predetermined period may be a period of time from when the refueling operation detection section detects a refueling operation to when the learning section starts the air-fuel ratio feedback control.

In the first aspect, the fuel return process control section may execute the return suppression process by prohibiting fuel in the delivery pipe from returning to the fuel tank through the return passage.

According to the above configuration, when a refueling operation is performed for the fuel tank, a return suppression process in which fuel in the delivery pipe is prohibited from returning to the fuel tank through the return passage is executed until air-fuel ratio feedback control is started. During that period, fuel with a known alcohol concentration can be injected from the injector, since fuel after completion of a concentration learning process and before a refueling operation, that is, fuel with a known alcohol concentration, remains in the delivery pipe and the main passage. Thus, deterioration of the air-fuel ratio can be suppressed until the concentration learning process is started.

After air-fuel ratio feedback control is started, meanwhile, a compulsory return process in which fuel remaining in the delivery pipe is compulsorily returned to the fuel tank through the return passage is executed. By executing the compulsory return process described above, fuel in the fuel supply system including the fuel tank, the main passage, the return passage, and the delivery pipe is circulated compulsorily, promoting mixture of fuels in the fuel supply system. The alcohol concentration of fuel in the fuel supply system can therefore be made uniform at an early stage. It is thus possible to shorten the time required for a learned value of the alcohol concentration to be stabilized from the start of the concentration learning process, that is, the time until the completion of the concentration learning process, even when the alcohol concentration of fuel stored in the fuel tank is varied by a refueling operation. As a result, fuel can be injected in such a manner that reflects the alcohol concentration at an early stage even if a refueling operation has been performed.

In the first aspect, in executing the compulsory return process, the return process control section may integrate an amount of fuel returned to the fuel tank through the return passage from when the fuel pump starts discharging fuel after a refueling operation has been detected, and may terminate the compulsory return process when the integrated amount exceeds the residual capacity of the main passage, the return passage, and the delivery pipe by a predetermined amount.

In the case where the integral of the discharge amount of fuel after the fuel pump starts discharging fuel exceeds an amount of fuel that can remain in the main passage, the return passage, and the delivery pipe by a predetermined amount, it is highly possible that the alcohol concentration of fuel in the fuel supply system including the fuel tank, the main passage, the return passage, and the delivery pipe has become uniform as all the fuel that has remained in the fuel supply system is returned to the fuel tank. According to the above configuration, the compulsory return process is therefore terminated when it is assumed that the alcohol concentration of fuel in the fuel supply system has become uniform as described above. The compulsory return process can thus be executed for an appropriate and not unnecessarily long period. The amount of fuel returned to the fuel tank through the return passage per hour is obtainable in advance through a calculation or an experiment on the basis of the pumping capacity of the fuel pump, the flow resistances of the main passage, the delivery pipe, and the return passage, and so forth. The amount of fuel that flows per hour is integrated cyclically to obtain the integral.

In the above configuration, the learning section may complete the concentration learning process when the compulsory return process is terminated.

It is assumed that the alcohol concentration of fuel in the fuel supply system has become uniform when the return process control section has terminated the compulsory return process as discussed above. In other words, the alcohol concentration of fuel in the fuel supply system is not uniform when the compulsory return process has not been terminated. Therefore, the alcohol concentration may still vary as a result of subsequent further mixing of fuels. According to the above configuration, the concentration learning process can be performed with high learning accuracy since the concentration learning process is terminated on condition that the compulsory return process is terminated.

In the above configuration, the return passage may be a high-pressure return passage that includes a high-pressure pressure adjustment valve for maintaining a fuel pressure in the delivery pipe at a sufficiently high pressure, and the return process control section may include a low-pressure return passage, connected to the main passage, that includes a low-pressure pressure adjustment valve with a lower valve opening pressure than the high-pressure pressure adjustment valve, and a switching valve that switches between a state in which fuel flows from the main passage into the low-pressure return passage and a state in which fuel cannot flow from the main passage into the low-pressure return passage, and the return process control section may open the switching valve to open the low-pressure return passage during the return suppression process and close the switching valve to close the low-pressure return passage during the compulsory return process.

According to the above configuration, the return process control section drives the switching valve to be open so as to open the low-pressure return passage in the return suppression process, equalizing the pressure of fuel in the main passage and the delivery pipe with the valve opening pressure of the low-pressure pressure adjustment valve. The high-pressure pressure adjustment valve in the high-pressure return passage is thus maintained closed, hindering introduction of fuel from the delivery pipe into the high-pressure return passage. That is, no fuel is returned from the delivery pipe to the fuel tank through the high-pressure return passage. As a result, it is possible to suppress mixture of fuels in order to inject fuel remaining in the main passage and the delivery pipe and having a known alcohol concentration, suppressing deterioration of the air-fuel ratio.

Meanwhile, the return process control section drives the switching valve to be closed so as to close the low-pressure return passage in the compulsory return process, making the pressure of fuel in the main passage and the delivery pipe higher than the valve opening pressure of the high-pressure pressure adjustment valve. The high-pressure pressure adjustment valve in the high-pressure return passage is thus maintained open, allowing introduction of fuel from the delivery pipe into the high-pressure return passage. As a result, fuel in the fuel supply system including the fuel tank, the main passage, the return passage, and the delivery pipe is circulated compulsorily, promoting mixture of fuels in the fuel supply system. The alcohol concentration of fuel in the fuel supply system can therefore be made uniform at an early stage. It is thus possible to shorten the time required for a learned value of the alcohol concentration to be stabilized from the start of the concentration learning process, that is, the time until the completion of the concentration learning process, through air-fuel ratio feedback control, allowing fuel to be injected in such a manner that reflects the alcohol concentration at an early stage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below with reference to FIG. 1 to FIG. 6F.

Figure 1:
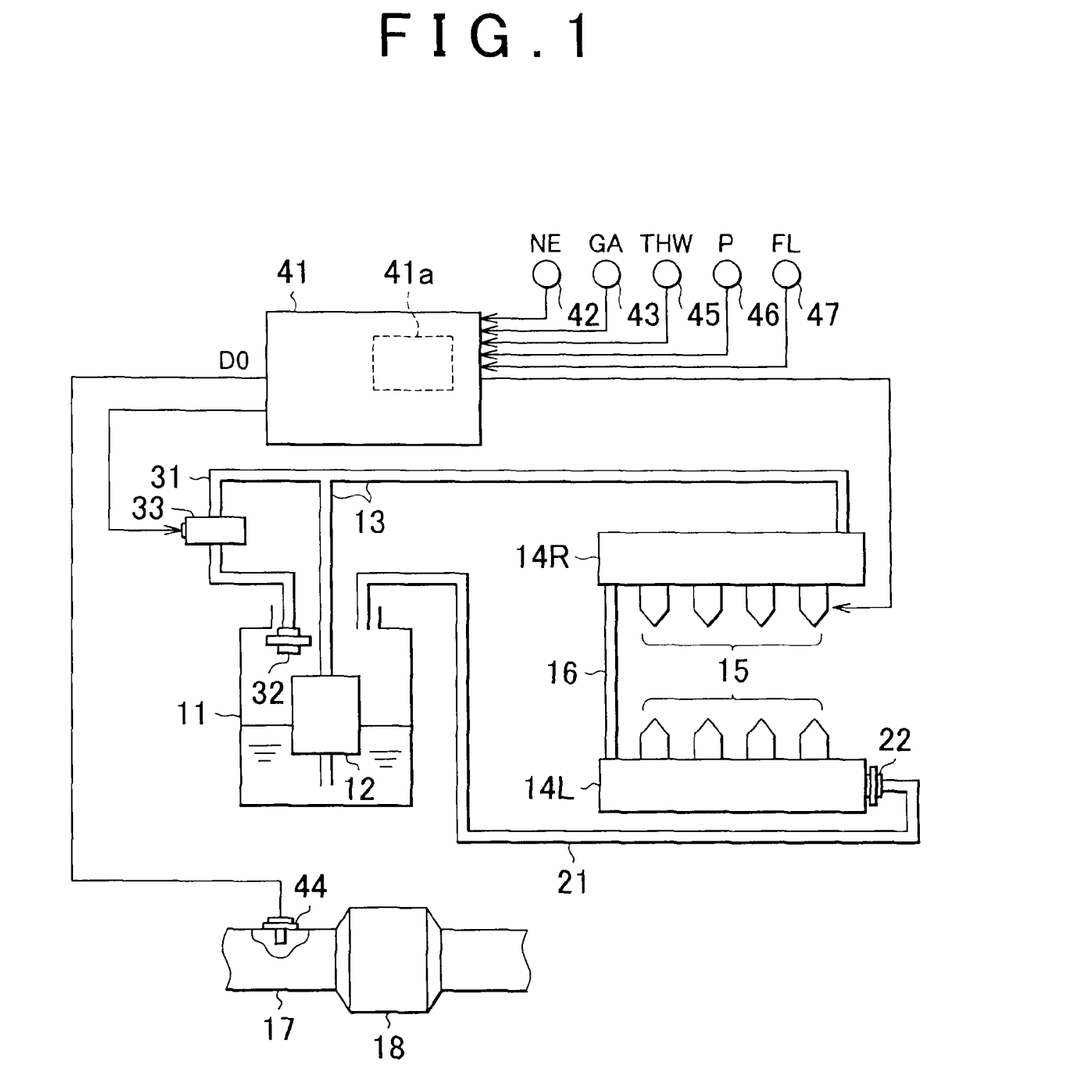
FIG. 1 is a diagram showing the schematic configuration of a fuel supply device according to an embodiment of the present invention.

<<Overall Configuration>> FIG. 1 shows the schematic configuration of a V-8 internal combustion engine mounted on a vehicle and a fuel supply device for the internal combustion engine. As shown in FIG. 1, the internal combustion engine includes a pair of delivery pipes 14R and 14L corresponding to the right and left banks of cylinders, respectively. Four injectors 15 corresponding to the respective cylinders are connected to each of the delivery pipes 14R and 14L. The internal combustion engine is a so-called "flexible-fuel internal combustion engine" which operates on a composite fuel prepared by mixing alcohol, specifically ethanol, in gasoline. The alcohol concentration of the composite fuel may differ in accordance with a previous refueling operation history, in other words, the alcohol concentration of fuel remaining in a fuel tank 11. Specifically, the alcohol concentration may vary in the range from 0% (pure gasoline) to 85%.

A fuel pump 12 is provided inside the fuel tank 11, and connected to one of the delivery pipes, 14, by way of a main passage 13. The other delivery pipe, 14 is then connected to the one delivery pipe 14R by way of a communication path 16. The other delivery pipe 14L is provided with a high-pressure pressure adjustment valve 22 that increases the fuel pressure (hereinafter, fuel injection pressure P) in the delivery pipes 14R and 14L. A high-pressure return passage 21 is connected to the other delivery pipe 14L via the high-pressure pressure adjustment valve 22. The high-pressure return passage 21 is connected to the fuel tank 11.

A low-pressure return passage 31 is connected to a portion of the main passage 13 located in the vicinity of the fuel tank 11. The low-pressure return passage 31 is provided with a low-pressure pressure adjustment valve 32 that reduces the fuel pressure in the delivery pipes 14R and 14L. A valve opening pressure PL of the low-pressure pressure adjustment valve 32 is lower than the valve opening pressure PH of the high-pressure pressure adjustment valve 22. The low-pressure return passage 31 is also provided with a fuel switching valve 33. Switching is performed in accordance with the position of the fuel switching valve 33 between a state in which fuel in the main passage 13 can flow into the low-pressure return passage 31 and a state in which fuel in the main passage 13 cannot flow into the low-pressure return passage 31.

That is, when the fuel switching valve 33 is closed, fuel cannot flow from the main passage 13 into the low-pressure return passage 31. All the fuel discharged from the fuel pump 12 into the main passage 13 is thus pumped into the delivery pipes 14R and 14L. When the fuel pressure in the delivery pipes 14R and 14L exceeds the valve opening pressure PH of the high-pressure pressure adjustment valve 22, the high-pressure pressure adjustment valve 22 is opened to return fuel to the fuel tank 11 through the high-pressure return passage 21. As a result, the fuel injection pressure P is maintained at generally the same level as the valve opening pressure PH of the high-pressure pressure adjustment valve 22.

When the fuel switching valve 33 is open, however, fuel flows from the main passage 13 into the low-pressure return passage 31. This increases the fuel pressure in the delivery pipes 14R and 14L, which opens the low-pressure pressure adjustment valve 32 before the high-pressure pressure adjustment valve 22 is opened. A portion of the fuel is returned to the fuel tank 11 through the low-pressure return passage 31 without being pumped into the delivery pipes 14R and 14L. As a result, the fuel injection pressure P is maintained at generally the same level as the valve opening pressure PL of the low-pressure pressure adjustment valve 32.

With the fuel supply device according to the embodiment, the fuel injection pressure P may be adjusted to different levels by changing the position of the fuel switching valve 33. Under a high load, basically, the fuel switching valve 33 is closed so that fuel is injected at a relatively high fuel injection pressure P (=PH). This is because it is necessary to inject a great amount of fuel under a high load. When using a fuel containing alcohol, which produces less heat than gasoline when combusted, it is also necessary to inject a great amount of fuel. Also in this case, the fuel switching valve 33 is closed so that fuel is injected at a relatively high fuel injection pressure P (=PH). Under a low load or when a fuel with a low alcohol concentration is used, on the other hand, the fuel switching valve 33 is opened so that fuel is injected at a relatively low fuel injection pressure P (=PL).

The internal combustion engine includes various sensors that detect various information including an operating state of the engine. For example, an engine speed sensor 42 that detects the rotational speed of a crankshaft (not shown), that is, an engine speed NE, is provided in the vicinity of the crankshaft. An intake air amount sensor 43 that detects an intake air amount GA is provided in an intake pipe (not shown). A three-way catalyst 18 is provided in an exhaust pipe 17. An oxygen concentration sensor 44 is provided upstream of the three-way catalyst 18. The oxygen concentration sensor 44 outputs a signal whose level varies continuously in accordance with the concentration of oxygen contained in exhaust air in the exhaust pipe 17 (oxygen concentration DO). The oxygen concentration sensor 44 can detect the oxygen concentration DO with high accuracy only when the temperature of its element is more than a predetermined activation temperature. The oxygen concentration sensor 44 therefore includes a built-in heater (not shown) that heats the element to raise the element temperature to the activation temperature when the exhaust temperature or the outside temperature is low. A coolant temperature sensor 45 that detects an engine coolant temperature THW is provided in a water jacket (not shown) of a cylinder block. The engine coolant temperature THW is correlated with the engine temperature and the fuel temperature, and may thus be used as a substitute for them. A fuel pressure sensor 46 that detects the fuel pressure (fuel injection pressure P) is provided in one, 14L, of the delivery pipes 14R and 14L. A fuel amount sensor 47 that detects the amount of fuel stored in the fuel tank 11 (fuel amount FL) is provided in the fuel tank 11.

Detection signals from the sensors 42 to 47 are acquired by an electronic control unit 41 of the internal combustion engine. The electronic control unit 41 includes a storage section 41a that stores various control programs, calculation maps, data calculated in executing various control, and so forth. The electronic control unit 41 drives the injectors 15, the fuel switching valve 33, and so forth on the basis of the detection signals from various sensors including the sensors 42 to 47 in order to execute control related to fuel injection such as control of the fuel injection amount, the fuel injection pressure, and the manner of fuel circulation.

<<Fuel Injection Control>> The air-fuel ratio feedback correction executed during fuel injection is described with reference to the flowchart of FIG. 2. The sequence of processes shown in the flowchart is executed by the electronic control unit 41 repeatedly at a predetermined frequency.

Figure 2:
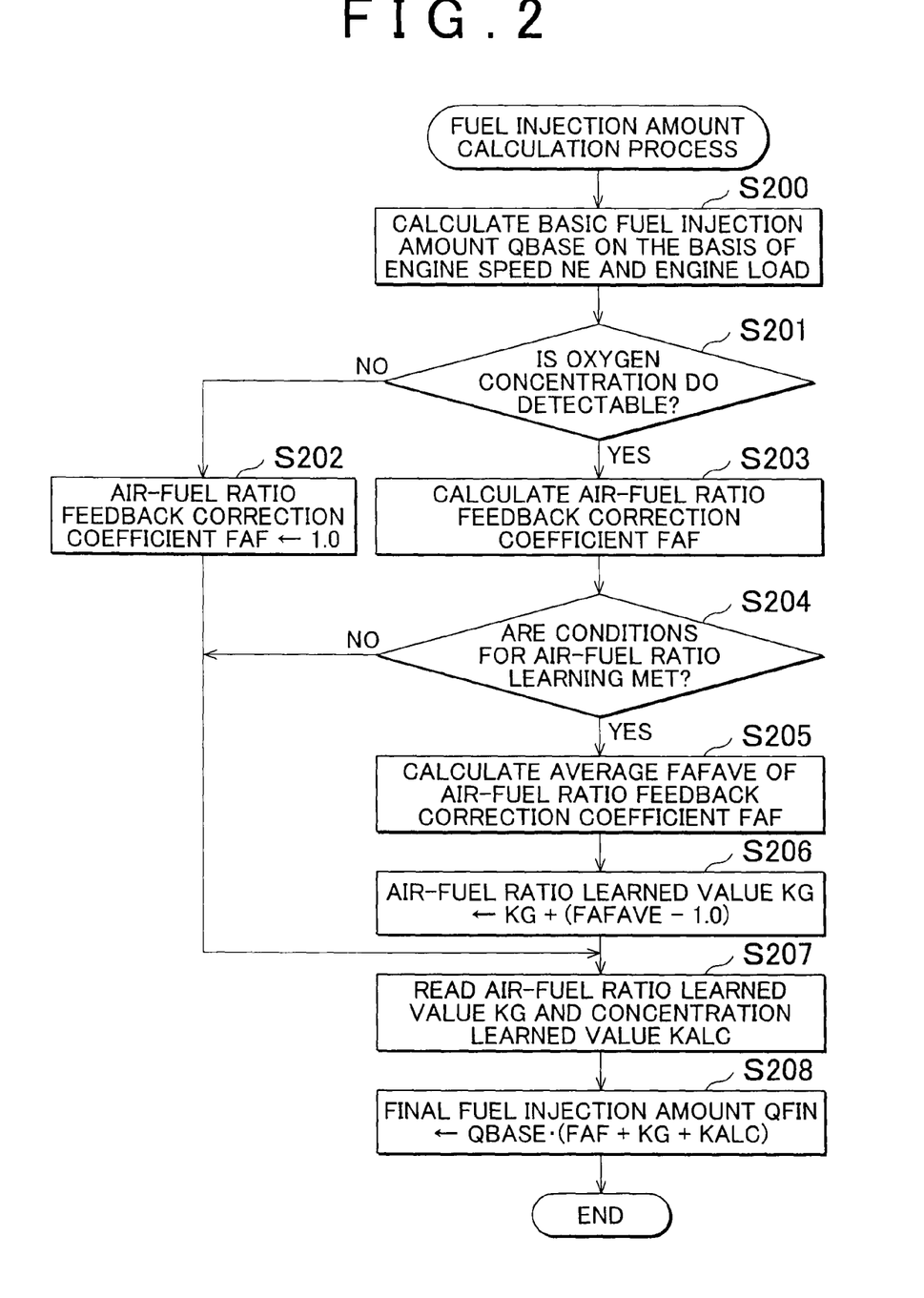
FIG. 2 is a flowchart showing the procedure for calculating the fuel injection amount according to the embodiment.

As shown in FIG. 2, a basic fuel injection amount QBASE is first calculated based on the engine speed NE and an engine load calculated based on the engine speed NE and the intake air amount GA (step S200).

It is next determined whether the oxygen concentration DO of exhaust air is detectable by the oxygen concentration sensor 44 (step S201). As described above, the oxygen concentration sensor 44 accurately detects the oxygen concentration DO only when the temperature of the sensor element of the sensor 44 is above a predetermined activation temperature. It is determined that the oxygen concentration DO is detectable by the oxygen concentration sensor 44 when the temperature of the sensor element is equal to or above a predetermined activation temperature. In the case of a cold start, it generally takes a predetermined period from the start of the engine for the element of the oxygen concentration sensor 44 to reach a predetermined activation temperature by being heated by a heater and exhaust air discharged as a result of engine combustion.

If it is determined that the oxygen concentration is detectable (step S201: YES), an air-fuel ratio feedback correction coefficient FAF is calculated based on the oxygen concentration detected by the oxygen concentration sensor 44. The air-fuel ratio feedback correction coefficient FAF is used to compensate for a temporary divergence between an oxygen concentration DO1 of exhaust air which would be discharged if gasoline is combusted at its theoretical air-fuel ratio and the oxygen concentration DO of the actual exhaust air. Specifically, if the oxygen concentration DO is less than the oxygen concentration DO1, that is, if the air-fuel ratio is rich, the air-fuel ratio feedback correction coefficient FAF is changed to a value lower than its reference value "1.0". As a result, the fuel injection amount is reduced. If the oxygen concentration DO is more than the oxygen concentration DO1, that is, if the air-fuel ratio is lean, the air-fuel ratio feedback correction coefficient FAF is changed to a value greater than its reference value "1.0". As a result, the fuel injection amount is increased.

Once the air-fuel ratio feedback correction coefficient FAF is calculated (step S203), it is next determined whether conditions for executing the air-fuel ratio leaning are satisfied (step S204). Examples of appropriate conditions include that the internal combustion engine is operating steadily with the vehicle not being accelerated or decelerated, or that the absolute value of a value obtained by subtracting "1.0" from the feedback correction coefficient FAF has been greater than a predetermined value for a predetermined period or more.

If it is determined that the conditions for executing the air-fuel ratio learning are satisfied (step S204: YES), an average FAFAVE of the air-fuel ratio feedback correction coefficient FAF over a predetermined period set in advance is calculated (step S205).

A new learned air-fuel ratio KG is then calculated by adding a value obtained by subtracting "1.0" from the average FAFAVE of the air-fuel ratio feedback correction coefficient FAF to a current learned air-fuel ratio KG (step S206). The thus calculated learned air-fuel ratio KG is stored in a backup RAM of the storage section 41a. As the learned air-fuel ratio KG is updated, the air-fuel ratio feedback correction coefficient FAF is reset to its initial value "1.0".

The learned air-fuel ratio KG and a learned alcohol concentration KALC are next read from the backup RAM of the storage section 41a (step S207). If it is determined that the oxygen concentration DO of exhaust air is not detectable by the oxygen concentration sensor 44 (step S201: NO), the air-fuel ratio feedback correction coefficient FAF is set to "1.0" (step S202), and the learned air-fuel ratio KG and the learned alcohol concentration KALC are read (step S207). Also, if it is determined that the execution conditions for air-fuel ratio learning are not satisfied (step S204: NO), the learned air-fuel ratio KG and the learned alcohol concentration KALC are read (step S207).

A final fuel injection amount QFIN is then calculated by adding the two learned values KG and KALC and the air-fuel ratio feedback correction coefficient FAF and multiplying the resulting value by the basic fuel injection amount QBASE (step S208).

When the final fuel injection amount QFIN is calculated, the process ends. A fuel injection time TAU, that is, the time for which the injectors 15 are opened, is calculated based on the final fuel injection amount QFIN and the detected fuel injection pressure P. Then, the electronic control unit 41 drives the injectors 15 to open based on the fuel injection time TAU. As a result, an amount of fuel equivalent to the final fuel injection amount QFIN is injected from the injectors 15.

<<Alcohol Concentration Learning>> Because the flexible-fuel internal combustion engine according to the embodiment operates on a fuel blended with alcohol, which has a lower theoretical air-fuel ratio than gasoline, it is necessary to increase the fuel injection amount for correction that the oxygen concentration DO of the actual exhaust air becomes equal to the oxygen concentration DO1 of exhaust air which would be discharged in the case where gasoline is combusted at its theoretical air-fuel ratio. When the fuel injection amount is corrected in this way, the catalyst device provided in the exhaust passage can fully demonstrate its purification performance, suppressing deterioration of exhaust properties. In the fuel injection control executed by the fuel supply device according to the embodiment, thus, the alcohol concentration of fuel is estimated and learned based on the oxygen concentration detected by the oxygen concentration sensor 44, and the fuel injection amount is corrected based on the learned alcohol concentration in the fuel.

Figure 3:
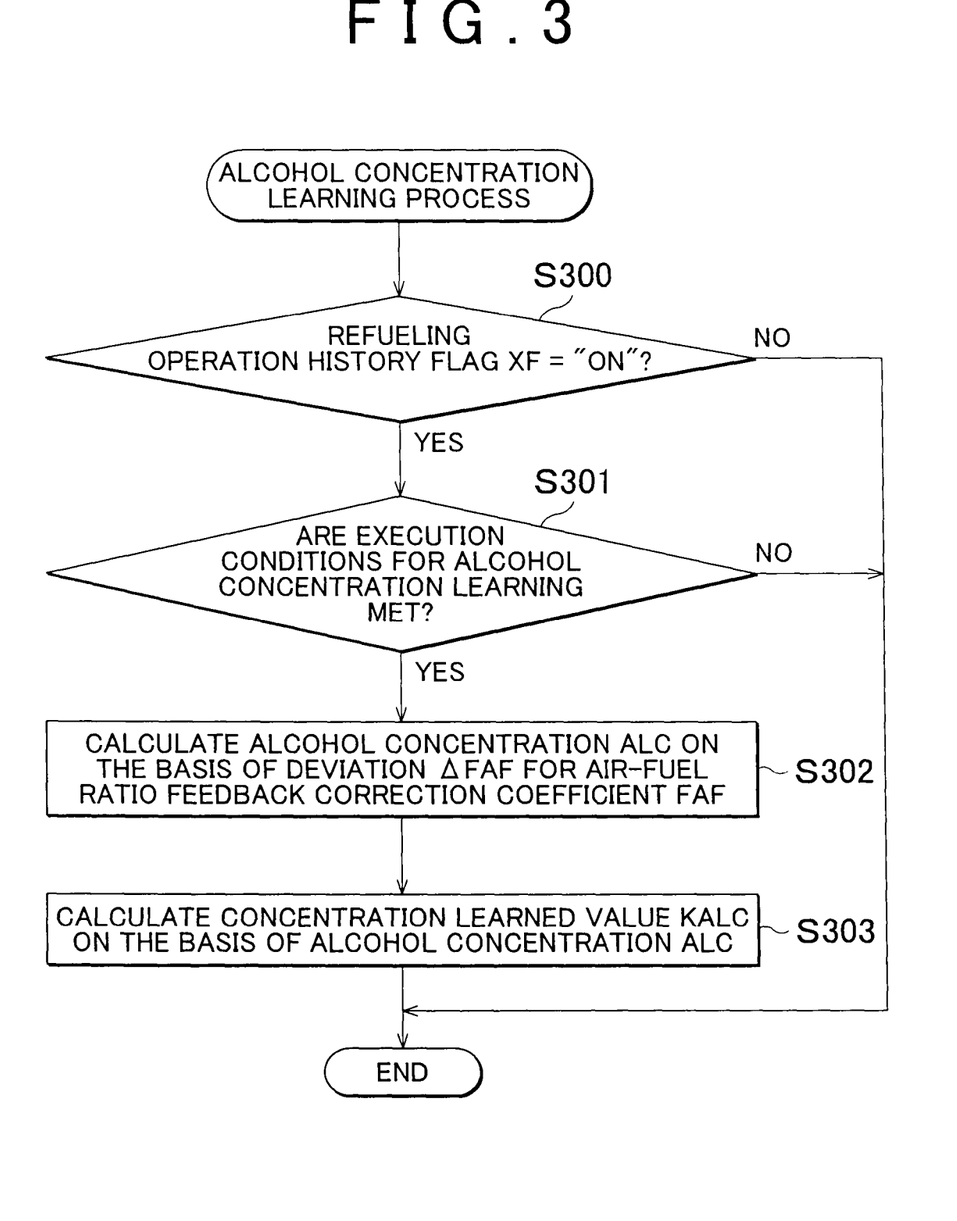
FIG. 3 is a flowchart showing the procedure for learning the alcohol concentration of fuel according to the embodiment.

An alcohol concentration learning process is described below with reference to FIG. 3. FIG. 3 is a flowchart showing the procedure of the alcohol concentration learning process. The sequence of processes shown in the flowchart is executed by the electronic control unit 41 at predetermined intervals. Execution of the air-fuel ratio learning process (step S203 to step S207) in the fuel injection amount calculation process is prohibited during execution of the alcohol concentration learning process.

In this sequence of processes, as shown in FIG. 3, it is first determined whether learning of an alcohol concentration ALC has been completed after a refueling operation is performed (step S300). Specifically, it is determined that learning of the alcohol concentration ALC has not been completed after a refueling operation is performed when a refueling operation history flag XF is set to "ON". The refueling operation history flag XF is set to "ON" when the fuel amount FL in the fuel tank 11 detected by the fuel amount sensor 47 has increased by at least a predetermined amount.

If it is determined that the refueling operation history flag XF is "OFF" (step S300: NO), the operation ends. If it is determined that a refueling operation has been performed (step S300: YES), in contrast, it is next determined whether the conditions for executing alcohol concentration learning are satisfied (step S301). The conditions for executing alcohol concentration learning are satisfied when the following conditions (1) and (2) are met.

(Condition 1) The oxygen concentration sensor 44 is activated. (Condition 2) The absolute value of the air-fuel ratio feedback correction coefficient FAF is not equal to 1.0.

If it is determined that the conditions for executing alcohol concentration learning are not satisfied (step S301: NO), the operation ends.

If the conditions for executing alcohol concentration learning are satisfied (step S301: YES), on the other hand, the air-fuel ratio feedback correction coefficient FAF is calculated based on the oxygen concentration detected by the oxygen concentration sensor 44, and a deviation ΔFAF between the air-fuel ratio feedback correction coefficient FAF and the initial value of the air-fuel ratio feedback correction coefficient FAF (=1.0). An alcohol concentration deviation ΔALC for the fuel is estimated based on the deviation ΔFAF, and the alcohol concentration ALC is further calculated based on the alcohol concentration deviation ΔALC (step S302).

Figure 4A:
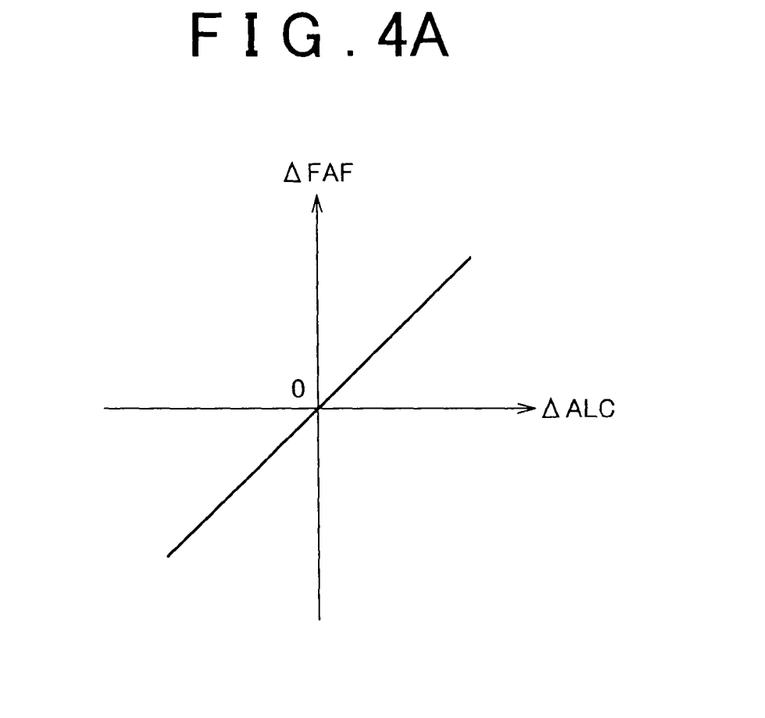
FIG. 4A is a graph showing the relationship between changes in an air-fuel ratio feedback correction coefficient and changes in alcohol concentration of fuel.

If the engine is started immediately after refueling, as shown in FIG. 4A, the deviation ΔFAF between the air-fuel ratio feedback correction coefficient FAF calculated after refueling and its initial value (=1.0) varies in accordance with changes in the alcohol concentration. The alcohol concentration deviation ΔALC for the fuel may thus be estimated based on the deviation ΔFAF for the air-fuel ratio feedback correction coefficient FAF. The alcohol concentration ALC is then calculated based on the following expression (1):

$$ALC \leftarrow ALC + \Delta ALC \tag{1}$$

Figure 4B:
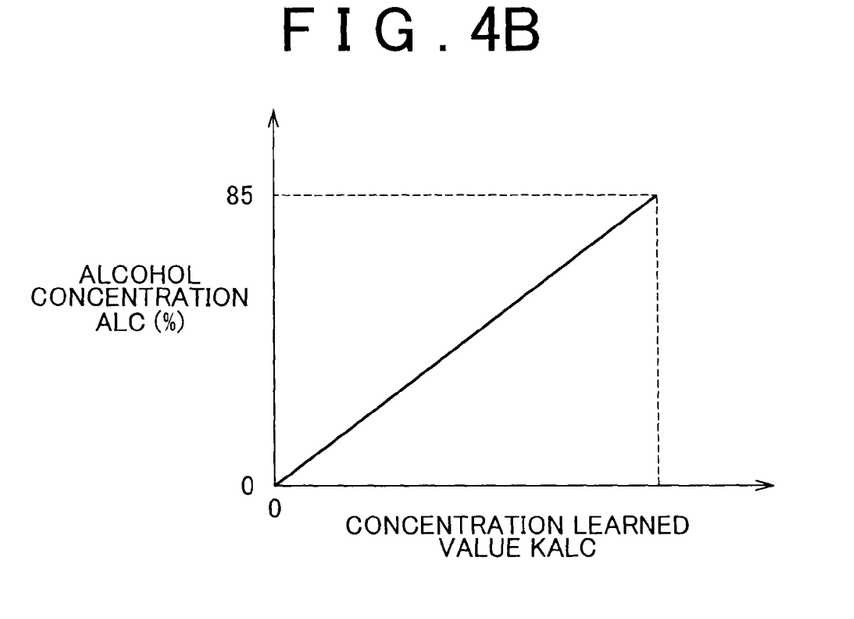
FIG. 4B is a graph showing the relationship between the alcohol concentration of fuel and a concentration learned value.

Subsequently, the learned alcohol concentration KALC according to the alcohol concentration ALC is calculated through a calculation map shown in FIG. 4B (step S303). The calculation map is prepared in advance on the basis of experiment results and so forth, and stored in a ROM of the storage section 41a. The thus calculated learned alcohol concentration KALC is stored in the backup RAM of the storage section 41a.

After the learned alcohol concentration KALC is calculated as described above, the operation ends.

<<Return Process Control>> In the flexible-fuel internal combustion engine described above, alcohol concentration learning may be started only if predetermined conditions are satisfied. Even if the conditions are satisfied and alcohol concentration learning is started, the alcohol concentration learning cannot be completed until the alcohol concentration in the fuel supply system becomes uniform in order to maintain the accuracy of the learned alcohol concentration. It thus takes a predetermined time until the completion of alcohol concentration learning in the case where a refueling operation is performed. If the alcohol concentration of fuel is varied by a refueling operation, therefore, it may be difficult for the fuel injection amount to be corrected in accordance with the alcohol concentration of the fuel until a predetermined period elapses, deteriorating the air-fuel ratio.

With the fuel supply device according to the embodiment, fuel in the delivery pipes 14R and 14L is prohibited from returning to the fuel tank 11 through the high-pressure return passage 21 by keeping the fuel switching valve 33 open after a refueling operation is performed until an air-fuel ratio feedback control is executed to start the alcohol concentration learning process. After the alcohol concentration learning process is started, meanwhile, fuel remaining in the delivery pipes 14R and 14L is compulsorily returned to the fuel tank 11 through the high-pressure return passage 21 by maintaining the fuel switching valve 33 closed, thereby promoting mixture of fuels in the fuel supply system. When the integrated amount of fuel returned to the fuel tank 11 through the high-pressure return passage 21 exceeds a predetermined value, the circulation of fuel is stopped, and alcohol concentration learning is completed.

Figure 5:
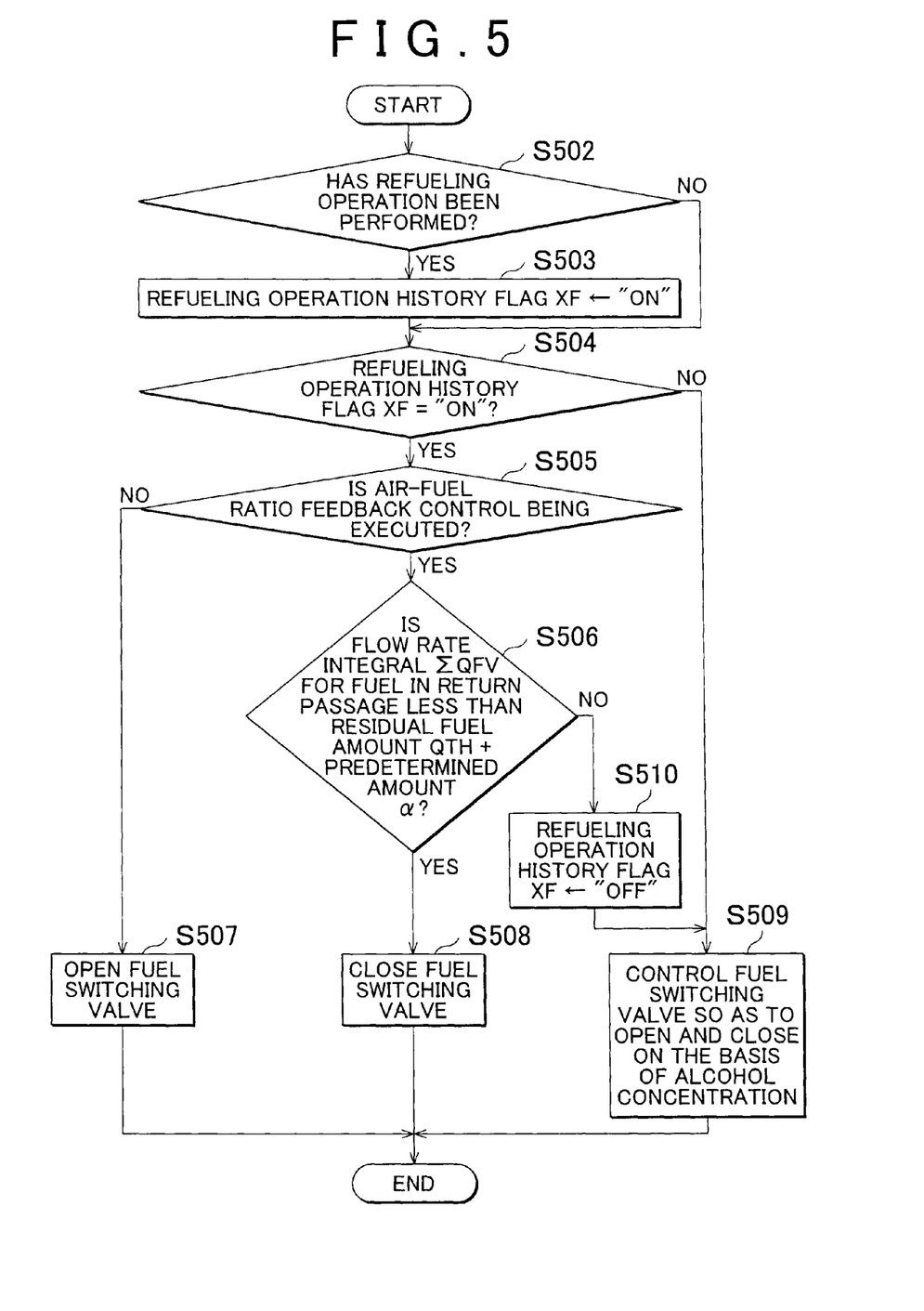
FIG. 5 is a flowchart showing the procedure for controlling driving of a fuel switching valve according to the embodiment; and FIG. 6A to FIG. 6F is a timing chart showing an exemplary manner of driving the fuel switching valve.

An opening/closing drive process for the fuel switching valve 33 performed after a refueling operation is described below with reference to FIG. 5 and FIG. 6A to FIG. 6F. FIG. 5 is a flowchart showing the procedure of the opening/closing drive process for the fuel switching valve 33. The sequence of processes shown in the flowchart is executed by the electronic control unit 41 at predetermined intervals.

As shown in FIG. 5, it is first determined whether a refueling operation has been performed (step S502). In the determination process, it is determined that a refueling operation has been performed if the fuel amount FL detected by the fuel amount sensor 47 of the fuel tank 11 has increased by at least a predetermined amount compared to an amount detected immediately before the engine was stopped.

If it is determined that a refueling operation has been performed (step S502: YES), the refueling operation history flag XF is set to "ON" (step S503), and it is next determined whether the refueling operation history flag XF is "ON" (step S504).

If it is determined that a refueling operation has not been performed (step S502: NO), in contrast, it is next determined whether the refueling operation history flag XF is "ON" (step S504).

If it is determined that the refueling operation history flag XF is "OFF" (step S504: NO), the fuel injection pressure P is controlled normally. Specifically, the fuel switching valve 33 is closed under a high load or when fuel with a high alcohol concentration is used. Otherwise, the fuel switching valve 33 remains open (step S509). Then, the operation ends.

If it is determined that the refueling operation history flag XF is "ON" (step S504: YES), in contrast, it is next determined whether air-fuel ratio feedback control has been started (step S505). The air-fuel ratio feedback control is executed when the element temperature of the oxygen concentration sensor 44 used in the air-fuel ratio feedback control has reached at least a predetermined activation temperature or more.

If it is determined that air-fuel ratio feedback control has not been executed (step S505: NO), the fuel switching valve 33 is opened (step S507). That is, the return of fuel in the delivery pipes 14R and 14L to the fuel tank 11 through the high-pressure return passage 21 is prohibited.

In this case, the learned alcohol concentration KALC is set to a learned value KALC used before the refueling operation. Even if fuel with a different alcohol concentration is injected into the fuel tank by a refueling operation, fuel with a known alcohol concentration remains in the main passage 13 and the delivery pipes 14R and 14L since the return process is prohibited. Thus, the learned alcohol concentration KALC may initially be approximated by the learned alcohol concentration KALC used before a refueling operation although the alcohol concentration of fuel to be injected varies gradually thereafter as mixture of fuels in the fuel supply system proceeds and the integrated amount of injected fuel increases. This suppresses deterioration of the air-fuel ratio. When the fuel switching valve 33 is opened and the learned alcohol concentration KALC is set as described above, the operation ends.

If it is determined that air-fuel ratio feedback control is being executed (step S505: YES), meanwhile, it is determined whether a flow rate integral ΣQFV for fuel returned from the delivery pipes 14R and 14L to the fuel tank 11 through the high-pressure return passage 21 is less than the sum of the residual fuel amount QTH and predetermined amount α (step S506). Specifically, an integral of a flow rate FV of fuel flowing through the high-pressure return passage 21 (flow rate integral ΣQFV) is first calculated using the following expression (2). The flow rate FV is then obtained based on the pumping capacity of the fuel pump 12, the flow resistances of the main passage 13, the delivery pipes 14R and 14L, and the high-pressure return passage 21, and so forth.

$$\Sigma QFV \leftarrow \Sigma QFV + FV \tag{2}$$

It is next determined whether the flow rate integral ΣQFV calculated by the expression (2) is greater than the sum of the amount of fuel that remains in the main passage 13, the delivery pipes 14R and 14L, and the high-pressure return passage 21 when the engine is stopped (residual fuel amount QTH) and the predetermined amount α (step S506). The predetermined amount α is a value obtained by adding a certain margin to a maximum amount of fuel assumed to be injected from the injectors 15 from when a refueling operation is detected (step S502) to when an air-fuel ratio feedback control is started.

A comparison is made between the flow rate integral ΣQFV and the value obtained by adding the predetermined amount α to the residual fuel amount QTH using the expression (3) (step S506).

$$\Sigma QFV > QTH + \alpha \quad (3)$$

If it is determined that the flow rate integral ΣQFV is not less than the sum of residual fuel amount QTH and the predetermined amount α (step S506: NO), the operation ends. If it is determined that the flow rate integral ΣQFV is less than the sum of the residual fuel amount QTH and the predetermined amount α (step S506: YES), the fuel switching valve 33 is closed (step S508). Calculation of the flow rate integral ΣQFV using expression (2) is repeated until the flow rate integral ΣQFV becomes equal to at least the sum of the residual fuel amount QTH and the predetermined amount α. When the flow rate integral ΣQFV becomes equal to at least the sum of the residual fuel amount QTH and the predetermined amount α, the refueling operation history flag XF is set to "OFF" (step S510), and the process proceeds to step S509, where actuation of the fuel switching valve 33 is controlled based on the alcohol concentration.

Figures 6A, 6B:
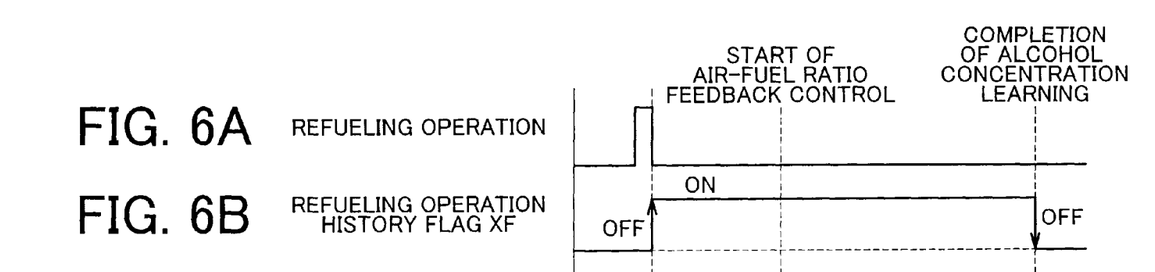
Figure 6C:
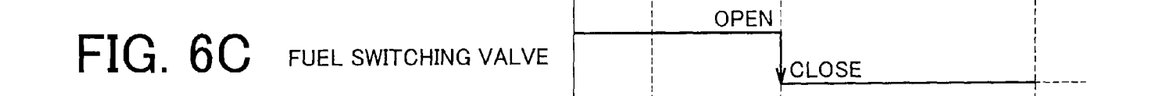
Figure 6D:
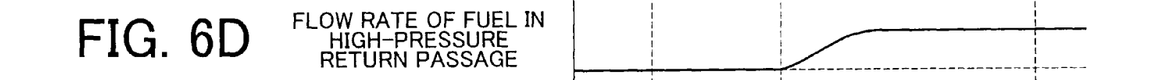
Figure 6E:
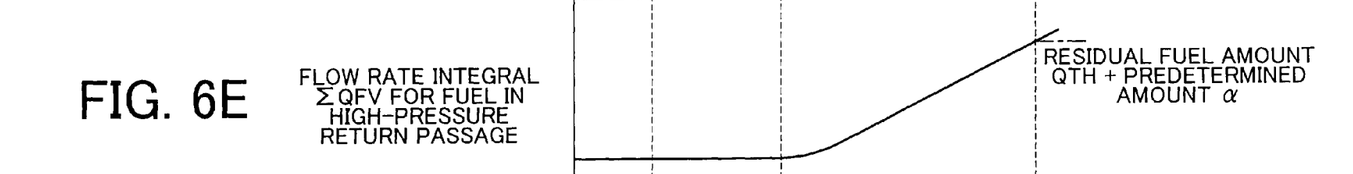
Figure 6F:
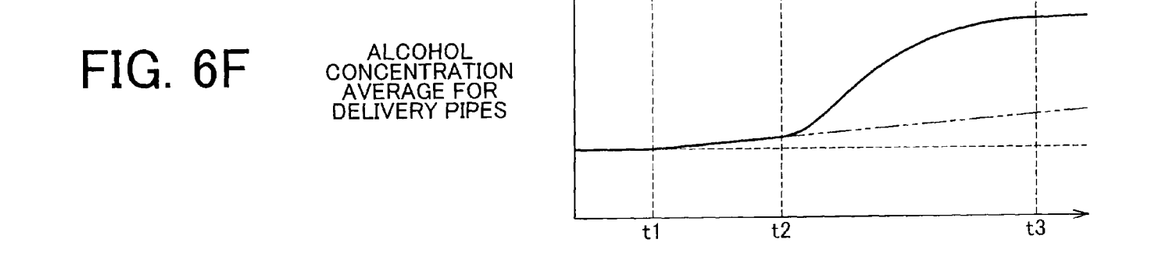

FIG. 6A to FIG. 6F shows transitions of (6A) whether a refueling operation is performed, (6B) whether the refueling operation history flag XF is ON or OFF, (6C) whether the fuel switching valve 33 is open or closed, (6D) the flow rate of fuel in the high-pressure return passage 21, (6E) the integral of the flow rate of fuel in the high-pressure return passage 21, and (6F) the average alcohol concentration of fuel in the delivery pipes 14R and 14L, all of which occur when the opening/closing drive process for the fuel switching valve 33 shown in the flowchart of FIG. 5 is executed. In FIG. 6F the chain double-dashed line indicates the average alcohol concentration of fuel in the delivery pipes 14R and 14L when fuel is not returned to the fuel tank 11 through the high-pressure return passage 21 with the fuel switching valve 33 maintained open. Examples of changes that may occur when the alcohol concentration ALC of fuel supplied additionally is higher than the alcohol concentration ALC of fuel remaining in the fuel tank 11 are shown in FIG. 6A to FIG. 6F.

When a refueling operation is performed as shown in FIG. 6A to FIG. 6F while the engine is stationary, the amount of fuel stored in the fuel tank 11 increases. The refueling operation history flag XF is therefore set to "ON" (timing t1). The fuel switching valve 33 remains open until air-fuel ratio feedback control is started. The average of the alcohol concentration of fuel in the delivery pipes 14R and 14L increases slightly during the period between the refueling operation and the start of air-fuel ratio feedback control (timing t1 to timing t2) because fuel after the refueling operation is supplied from the fuel tank 11 through the main passage 13 along with fuel injection from the delivery pipes 14R and 14L. Even if fuel is injected using a learned value KALC obtained before the refueling operation in place of the learned alcohol concentration KALC, however, deterioration of the air-fuel ratio may be minimized because the increase in average alcohol concentration is negligible. As the engine temperature increases, the oxygen concentration sensor 44 is activated. As a result, the conditions for starting the execution of the air-fuel ratio feedback control are satisfied. After air-fuel ratio feedback control is started, the fuel switching valve 33 remains closed (timing t2). As a result, fuel in the delivery pipes 14R and 14L is returned to the fuel tank 11 through the high-pressure return passage 21, thereby promoting the mixture of fuels and rapidly increasing the average alcohol concentration of the fuel in the delivery pipes 14R and 14L (timing t2 to timing t3). Subsequently, when the flow rate integral ΣQVF exceeds the sum of the residual fuel amount QTH and the predetermined amount α, the average of the alcohol concentration of fuel in the delivery pipes 14R and 14L converges to a predetermined value. Then the alcohol concentration learning is completed, and the refueling operation history flag XF is set to "OFF" (timing t3).

The fuel supply device for a flexible-fuel internal combustion engine according to the embodiment described above can obtain the effects enumerated below. (1) When a refueling operation is performed, fuel in the delivery pipes 14R and 14L is prohibited from returning to the fuel tank 11 through the high-pressure return passage 21 until alcohol concentration learning is started. During that period, fuel with a known alcohol concentration may be injected from the injectors 15, since fuel after completion of alcohol concentration learning and before a refueling operation, that is, fuel with a known alcohol concentration, remains in the delivery pipes 14R and 14L and the main passage 13. Thus, deterioration of the air-fuel ratio can be suppressed until alcohol concentration learning is started. After alcohol concentration learning is started, meanwhile, fuel remaining in the delivery pipes 14R and 14L is compulsorily returned to the fuel tank 11 through the high-pressure return passage 21 by keeping the fuel switching valve 33 closed. By compulsorily returning fuel remaining in the delivery pipes 14R and 14L to the fuel tank 11, fuel in the fuel supply system including the fuel tank 11, the main passage 13, the high-pressure return passage 21, and the delivery pipes 14R and 14L is circulated to mix the fuels with varying alcohol concentration in the fuel supply system. The alcohol concentration in the fuel supply system can therefore be made uniform at an early stage. It is thus possible to reduce the time required to stabilize the learned alcohol concentration after the alcohol concentration learning is started, even when the alcohol concentration of fuel stored in the fuel tank 11 is varied by a refueling operation. As a result, fuel may be injected in such a manner that reflects the alcohol concentration at an early stage even if a refueling operation has been performed.

(2) When the flow rate integral ΣQFV of fuel that is returned from the delivery pipes 14R and 14L to the fuel tank 11 through the high-pressure return passage 21 after the fuel pump 12 starts discharging fuel exceeds the residual fuel amount QTH by the predetermined amount α, it is highly likely that the alcohol concentration of fuel in the fuel supply system has become uniform as all the fuel present in the fuel supply system is returned to the fuel tank 11. In the above configuration, therefore, such compulsory circulation of fuel is stopped, and the alcohol concentration learning is completed when the flow rate integral ΣQFV exceeds the residual fuel amount QTH by the predetermined amount α. The circulation of fuel can thus be executed for an appropriate and not unnecessarily long period.

(3) The alcohol concentration of fuel in the fuel supply system is not uniform when fuel remaining in the delivery pipes 14R and 14L is compulsorily returned to the fuel tank 11 through the high-pressure return passage 21. Therefore, even if the alcohol concentration is learned during this period, the learned value may still be varied by subsequent mixture of fuels. According to the above configuration, alcohol concentration learning is completed on condition that it is highly possible that the alcohol concentration of fuel in the fuel supply system has become uniform, suppressing reduction in accuracy of the alcohol concentration learning.

The above embodiment may be modified suitably and implemented as follows. In the above embodiment, it is determined that a refueling operation has been performed if the fuel amount detected by the fuel amount sensor 47 of the fuel tank 11 has increased by at least a predetermined amount compared to an amount detected previously. The present invention is not to this configuration, and a detection section that detects the opening/closing of a fuel filler cap may be provided to determine whether a refueling operation has been performed on the basis of whether the fuel filler cap is opened or closed. Alternatively, a detection section that detects an operation to insert a fuel nozzle into a fuel filler opening may be provided to determine whether a refueling operation has been performed on the basis of whether or not such insertion is performed. According to the configuration, functions and effects similar to those of the above embodiment can be obtained.

The alcohol that is blended with the gasoline is not limited to ethanol, and may be methanol, isopropyl alcohol, or the like. According to the configuration, functions and effects similar to those of the above embodiment can be obtained.

In the above embodiment, fuel in the delivery pipes 14R and 14L is restrained from returning to the fuel tank 11 through the high-pressure return passage 21 by opening the fuel switching valve 33 provided in the low-pressure return passage 31 after a refueling operation is detected until air-fuel ratio feedback control is started. The present invention is not restricted to this configuration, and fuel in the delivery pipes 14R and 14L may be restrained from returning to the fuel tank 11 by reducing the pumping amount of the fuel pump 12 relative to the case where no refueling operation is performed. According to the configuration, functions and effects similar to those of the above embodiment can be obtained.

In the above embodiment, mixture of fuels is promoted by returning fuel in the delivery pipes 14R and 14L to the fuel tank 11 through the high-pressure return passage 21 by closing the fuel switching valve 33 provided in the low-pressure return passage 31. The present invention is not restricted to this configuration, and the fuel in the delivery pipes 14R and 14L may be returned to the fuel tank 11 by increasing the pumping amount of the fuel pump 12. According to the configuration, functions and effects similar to those of the above embodiment can be obtained.

In the above embodiment, the fuel switching valve 33 is controlled to remain closed from the time a refueling operation is detected until an air-fuel ratio feedback control is started. However, the fuel switching valve 33 may instead remain closed for a fixed period set in advance and which starts from the detection of a refueling operation. According to the configuration, functions and effects similar to those of (1) above can be obtained.

In the above embodiment, the fuel switching valve 33 is controlled to open and close based on the integral of the amount of fuel that is returned to the fuel tank 11 through the high-pressure return passage 21. The present invention is not restricted to this configuration, and it may instead directly measure the flow rate of fuel returned to the fuel tank 11 through the high-pressure return passage 21, or the flow rate of fuel carried in the delivery pipes 14R and 14L through the main passage 13. According to the configuration, functions and effects similar to those of the above embodiment can be obtained.

What is claimed is:

1. A fuel supply device for a flexible-fuel internal combustion engine, comprising:
    a main passage through which a fuel pump pumps fuel from a fuel tank to a delivery pipe to which an injector is connected;
    a return passage through which fuel is returned from the delivery pipe to the fuel tank;
    a learning section that executes a concentration learning process in which a concentration of alcohol contained in fuel in the fuel tank is learned as a concentration learned value through an air-fuel ratio feedback control based on an oxygen concentration detected by an oxygen concentration sensor provided in an exhaust passage;
    a refueling operation detection section that detects whether a refueling operation has been performed for the fuel tank; and
    a return process control section that, when the refueling operation detection section detects that the refueling operation has been performed, executes a return suppression process to prevent fuel in the delivery pipe from returning to the fuel tank through the return passage for a predetermined period before the learning section starts the air-fuel ratio feedback control, and the return process control section executes a compulsory return process in which fuel in the delivery pipe is compulsorily returned to the fuel tank through the return passage after the air-fuel ratio feedback control is started.

2. The fuel supply device according to claim 1, wherein the predetermined period is a period of time from when the refueling operation detection section detects the refueling operation to when the learning section starts the air-fuel ratio feedback control.

3. The fuel supply device according to claim 1, wherein the return process control section executes the return suppression process by prohibiting fuel in the delivery pipe from returning to the fuel tank through the return passage.

4. The fuel supply device according to claim 1, wherein the return process control section executes the return suppression process by reducing a discharge amount of the fuel pump compared to that when no refueling operation has been performed.

5. The fuel supply device according to claim 1, wherein in executing the compulsory return process, the return process control section integrates an amount of fuel returned to the fuel tank through the return passage from when the fuel pump starts discharging fuel after the refueling operation has been detected, and terminates the compulsory return process when the integrated amount exceeds a residual capacity of the main passage, the return passage, and the delivery pipe by a predetermined amount.

6. The fuel supply device according to claim 5, wherein the learning section completes the concentration learning process when the compulsory return process is terminated.

7. The fuel supply device according to claim 3,
    wherein the return passage is a high-pressure return passage that includes a high-pressure pressure adjustment valve for adjusting a fuel pressure in the delivery pipe to a high pressure, and the return process control section includes a low-pressure return passage, connected to the main passage, that includes a low-pressure pressure adjustment valve with a lower valve opening pressure than the high-pressure pressure adjustment valve, and a switching valve that switches between a state in which fuel flows from the main passage into the low-pressure return passage and a state in which fuel cannot flow from the main passage into the low-pressure return passage, and
    wherein the return process control section opens the switching valve to open the low-pressure return passage during the return suppression process and closes the switching valve to close the low-pressure return passage during the compulsory return process.

* * * * *